United States Patent
Otterbach et al.

(10) Patent No.: US 10,846,366 B1
(45) Date of Patent: Nov. 24, 2020

(54) SELECTING PARAMETERS FOR A QUANTUM APPROXIMATE OPTIMIZATION ALGORITHM (QAOA)

(71) Applicant: Rigetti & Co, Inc., Berkeley, CA (US)

(72) Inventors: Johannes Sebastian Otterbach, Oakland, CA (US); Jonathan Ward, Oakland, CA (US); Marcus Palmer da Silva, Lafayette, CA (US); Nicholas C. Rubin, Berkeley, CA (US)

(73) Assignee: Rigetti & Co, Inc., Berekley, CA (US)

( * ) Notice: Subject to any disclaimer, the term of this patent is extended or adjusted under 35 U.S.C. 154(b) by 0 days.

(21) Appl. No.: 16/217,410

(22) Filed: Dec. 12, 2018

Related U.S. Application Data

(60) Provisional application No. 62/597,836, filed on Dec. 12, 2017.

(51) Int. Cl.
*G06F 17/17* (2006.01)

(52) U.S. Cl.
CPC .................. *G06F 17/17* (2013.01)

(58) Field of Classification Search
CPC ...................................... G06F 17/17
USPC ....................................... 708/207
See application file for complete search history.

(56) References Cited

U.S. PATENT DOCUMENTS

| | | |
|---|---|---|
| 2004/0119061 A1 | 6/2004 | Wu et al. |
| 2015/0032994 A1 | 1/2015 | Chudak et al. |
| 2016/0012346 A1 | 1/2016 | Biamonte et al. |
| 2016/0062951 A1 | 3/2016 | Yoshimura et al. |
| 2017/0330101 A1 | 11/2017 | Hastings et al. |
| 2018/0260245 A1 | 9/2018 | Smith |
| 2018/0260731 A1 | 9/2018 | Zeng et al. |
| 2018/0365585 A1 | 12/2018 | Smith et al. |
| 2019/0354897 A1* | 11/2019 | Horesh ............... G06F 17/16 |
| 2019/0384597 A1* | 12/2019 | Horesh ............... G06N 10/00 |
| 2020/0019879 A1* | 1/2020 | Xue ..................... G06N 10/00 |

FOREIGN PATENT DOCUMENTS

WO    2018089792    5/2018

OTHER PUBLICATIONS

Wang, et al., "The Quantum Approximation Optimization Algorithm for MaxCut: A Fermionic View", 2017, 13 pgs.

Zeng, "Quantum Approximate Optimization on a Gate-model Superconducting Processor", APS Mar. Meeting, Mar. 15, 2017, 37 pgs.

Rigetti Computing; Pyquil; https://web.archive.org/web/20171129090055/https://github.com/rigetticomputing/pyquil; Nov. 29, 2017; 3 pgs.

Forest beta; An API for Quantum Computing in the Cloud; https://web.archive.org/web/20171109163658/http://www.rigetti.com/forest; Nov. 9, 2017; 4 pgs.

(Continued)

*Primary Examiner* — Tan V Mai
(74) *Attorney, Agent, or Firm* — Henry Patent Law Firm PLLC

(57) ABSTRACT

In a general aspect, values of input parameters for a quantum approximate optimization algorithm (QAOA) are selected by a Bayesian optimizer. The QAOA can be configured to solve a combinatorial optimization problem (COP), such as Maximum Cut. A hybrid classical-quantum computing system can be used to execute the QAOA and select the input parameters.

14 Claims, 2 Drawing Sheets

(56) References Cited

OTHER PUBLICATIONS

Nogueira; Bayesian-optimization; https://web.archive.org/web/20170630225221/https://github.com/fmfn/BayesianOptimization; Jun. 30, 2017; 4 pgs.
USPTO, Third Party Submission dated Jan. 30, 2019, in U.S. Appl. No. 15/914,662, 55 pgs.
Aharonov, et al., "Fault-Tolerant Quantum Computation with Constant Error Rate", SIAM Journal of Computing 38 (4), Jul. 2008, 76 pgs.
Alidaee, "0-1 Quadratic programming approach for optimum solutions of two scheduling problems", Int. J. Systems Sci. 25(2), 1994, 8 pgs.
Aliferis, et al., "Quantum Accuracy Threshold for Concatenated Distance-3 Codes", Quantum Information and Computation 6(2), 2006, 58 pgs.
Ausiello, et al., "Complexity and Approximation: Combinatorial Optimization Problems and Their Approximability Properties", Springer-Verlag Berlin Heidelberg, 1999, 533 pgs.
Bergstra, et al., "Random Search for Hyper-Parameter Optimization", J. Machine Learning Research 13, Feb. 2012, 25 pgs.
Blais, et al., "Cavity quantum electrodynamics for superconducting electrical circuits: an architecture for quantum ,computation", Phys. Rev. A, vol. 69, 062320, American Physical Society; Ridge, NY; US, 2004, 14 pgs.
Blais, Alexandre, et al., "Quantum-information processing with circuit quantum electrodynamics", Physical Review A 75, 032329 (2007), Mar. 22, 2007, 21 pgs.
Blitzstein, et al., "Introduction to Probability", CRC Press, 2015, 572 pgs.
Boriah, et al., "Similarity Measures for Categorical Data: A Comparative Evaluation", Proceedings of the 2008 SIAM Int'l Conf on Data Mining:, 2008, 12 pgs.
Caldwell, et al., "Parametrically-Activated Entangling Gates Using Transmon Qubits", arXiv:1706.06562v1, Jun. 20, 2017, 6 pgs.
Das, et al., "Colloquium: Quantum annealing and analog quantum computation", Review of Modem Physics 80(3), Sep. 5, 2008, 21 pgs.
Didier, et al., "Analytical modeling of parametrically-modulated transmon qubits", arXiv:1706.06566v1, Jun. 20, 2017, 10 pgs.
Farhi, E., et al., "A Quantum Approximate Optimization Algorithm", arXiv:1411.4028v1 [quant-ph], Nov. 14, 2014, 16 pages.
Farhi, E , et al., "A Quantum Approximate Optimization Algorithm Applied to a Bounded Occurrence Constraint Problem", arXiv:1412.6062v2 [quant-ph], Jun. 25, 2015, 13 pages.
Farhi, E , et al., "Quantum Supremacy through the Quantum Approximate Optimization Algorithm", arXiv:1602.07674v1 [quant-ph], Feb. 24, 2016, 22 pages.
Gallo, et al., "Quadratic Knapsack Problems", Mathematical Programming 12, 1980, 18 pgs.
Guerreschi, et al., "Practical Optimization for Hybrid Quantum-Classical Algorithms", arXiv:1701.01450v1 [quant-ph], Jan. 5, 2017, 25 pgs.
Hen, I. , et al., "Driver Hamiltonians for Constrained Optimization in Quantum Annealing", Phys. Rev. A 93, 062312; arXiv:1602.07942v2 [quant-ph], Jul. 7, 2016, 9 pgs.
Jain, et al., "Algorithms for Clustering Data", Prentice-Hall, Inc., 1988, 330 pgs.
Jain, et al., "Data Clustering: A Review", ACM Computing Surveys 31(3), 1999, 60 pgs.
Karp, "Reducibility Among Combinatorial Problems", Complexity of Computer Computations, 1972, 19 pgs.
Kim, et al., "Robust entanglement renormalization on a noisy quantum computer", arXiv:1711.07500v1, Nov. 20, 2017, 17 pgs.
Knill, et al., "Resilient Quantum Computation", Science 279(5349), 1998, 4 pgs.
Koch, Jens, et al., "Charge-insensitive qubit design derived from the Cooper pair box", Physical Review A 76, 042319, Oct. 12, 2007, 19 pages.
Kochenberger, et al., "The unconstrained binary quadratic programming problem: a survey", J. Combinatorial Optimization 28, Apr. 18, 2014, 24 pgs.
Krarup, et al., "Computer-Aided Layout Design", Mathematical Programming in Use, 1978, 20 pgs.
Lucas, "Ising formulations of many NP problems", arXiv:1302.5843v3, Jan. 24, 2014, 27 pgs.
Magesan, et al., "Scalable and Robust Randomized Benchmarking of Quantum Processes", Physical Review Letters 106, 180504, May 2011, 4 pgs.
Makhlin, et al., "Quantum state engineering with Josephson-junction devices", arXiv:cond-mat/0011269v1, Nov. 15, 2000, 46 pgs.
McClean, et al., "The theory of variational hybrid quantum-classical algorithms", New J. Phys. 18 (2016)023023, Feb. 5, 2016, 23 pgs.
Moll, et al., "Quantum optimization using variational algorithms on near-term quantum devices", arXiv:1710.01022v2 [quant-ph], Oct. 9, 2017, 30 pgs.
Neven, et al., "Image recognition with an adiabatic quantum computer", arXiv:0804.4457v1, Apr. 28, 2008, 7 pgs.
Nielsen, et al., "Quantum Computation and Quantum Information", Cambridge Univ. Press, 2010, 704 pgs.
Otterbach, "Unsupervised Machine Learning on a Hybrid Quantum Computer", arXiv:1712.05771v1, Dec. 15, 2017, 17 pgs.
Peruzzo, Alberto, et al., "A Variational Eigenvalue Solver on a Photonic Quantum Processor", Nature Communications, DOI: 10.1038/ncomms5213, Jul. 23, 2014.
Poljak, et al., "Maximum Cuts and Large Bipartite Subgraphs", Combinatorial Optimization: 181-244/DIMACS Series in Discrete Mathematics and Theoretical Computer Science, 1995, 65 pgs.
Rasmussen, et al., "Gaussian Processes for Machine Learning", MIT Press, 2006, 266 pgs.
Reagor, et al., "Demonstration of Universal Parametric Entangling Gates on a Multi-Qubit Lattice", arXiv:1706.06570v2 [quant-ph], Jul. 13, 2017, 7 pgs.
Reagor, Matthew James, "Superconducting Cavities for Circuit Quantum Electrodynamics", Dissertation, Yale University, Dec. 2015, 220 pgs.
Shahriari, et al., "Taking the Human Out of the Loop: A Review of Bayesian Optimization", Proceedings of the IEEE 104(1), Jan. 2016, 28 pgs.
Shirkhorshidi, et al., "A Comparison Study on Similarity and Dissimilarity Measures in Clustering Continuous Data", PLOS ONE 10(12): e0144059, Dec. 11, 2015, 20 pgs.
Shor, "Algorithms for Quantum Computation: Discrete Logarithms and Factoring", Proceedings of the 35th Conf. on Foundations of Computer Science, 1994, 11 pgs.
Shor, "Fault-Tolerant Quantum Computation", Proceedings of the 37th Conf. on Foundations of Computer Science, 1996, 10 pgs.
Smith, Robert S, et al., "A Practical Quantum Instruction Set Architecture", arXiv:1608.03355v1 [quant-ph], Aug. 11, 2016, 14 pages.
Smolin, et al., "Oversimplifying quantum factoring", Nature 499(7457), Jul. 11, 2013, 3 pgs.
Snoek, et al., "Practical Bayesian Optimization of Machine Learning Algorithms", Proceedings of the 25th Intl Conf on Neural Info Processing Systems, 2012, 9 pgs.
Snoek, et al., "Scalable Bayesian Optimization Using Deep Neural Networks", Proceedings of Machine Learning Research 37, 2015, 10 pgs.
Vahidpour, et al., "Superconducting Through-Silicon Vias for Quantum Integrated Circuits", arXiv:1708.02226v1 [physics.app-ph], Aug. 7, 2017, 5 pgs.
Vion, et al., "Manipulating the Quantum State of an Electrical Circuit", Science 296, 886, 2002, 5 pgs.

* cited by examiner

SELECTING PARAMETERS FOR A QUANTUM APPROXIMATE OPTIMIZATION ALGORITHM (QAOA)

CROSS-REFERENCE TO RELATED APPLICATIONS

This application claims priority to U.S. Provisional Application Ser. No. 62/597,836 entitled "Selecting Parameters for a Quantum Approximate Optimization Algorithm (QAOA)" and filed on Dec. 12, 2017. The priority application is incorporated herein by reference.

BACKGROUND

The following description relates to quantum approximate optimization algorithms.

Quantum computers can perform computational tasks by executing quantum algorithms. A quantum algorithm can be represented, for example, as a quantum Hamiltonian, a sequence of quantum logic operations, a set of quantum machine instructions, or otherwise. A variety of physical systems have been proposed as quantum computing systems. Examples include superconducting circuits, trapped ions, spin systems and others.

DETAILED DESCRIPTION

Figure 1:
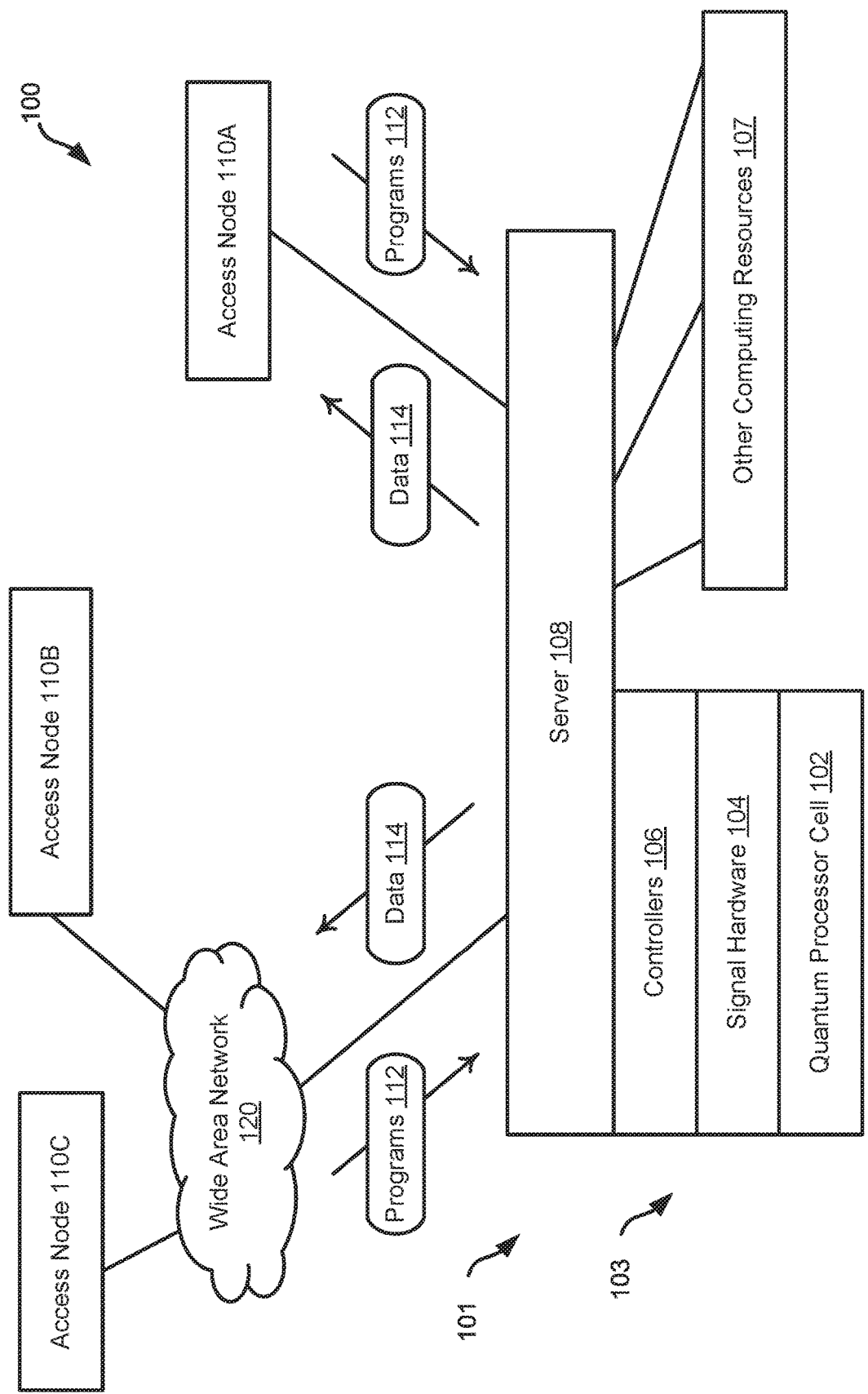
FIG. 1 is a block diagram of an example computing system.

Many discrete optimization problems in industry and science take the form of Combinatorial Optimization problems (COPs). Examples range from scheduling, network traffic routing and portfolio optimization to statistics, physics and chemistry. COPs come in the form of finding a feasible set $S \subset 2^{|\varepsilon|}$ of (approximately) optimal solutions from the set of all sets, where $|\varepsilon|$ is the size of the problem measured in bits, and the space of possible solutions scales exponentially with $|\varepsilon|$. The challenge is to develop heuristics and algorithms that produce the set S (or even just a member of this set) without having to list and check all $2^{|\varepsilon|}$ combinations.

Many NP-complete problems, e.g., all of Karp's 21 problems (as well as others), can be cast as finding the ground-state of a classical Ising model corresponding to an arbitrary graph and hence fall into the class of discrete optimization problems. By sampling classic bit-strings we will eventually find an optimal one that minimizes the energy of the Ising model.

The quantum approximate optimization algorithm (QAOA) can be viewed through the lens of probabilistic optimization algorithms. QAOA can be interpreted as a parameterized quantum logic gate prescription, whose execution prepares a distribution of bitstrings that can be sampled. A COP can be encoded in the QAOA, and optimizing the parameters in the QAOA leads to distributions that allow efficient sampling of (approximately) optimal solutions to the encoded COP. For example, the number of samples needed to find a feasible solution is substantially smaller than the number required via random sampling of the full exponential state space. Bayesian Optimization can be used to optimize the parameters and sample from the corresponding distribution.

According to some embodiments, a method for executing QAOA with Bayesian optimization of the selection of input parameters may comprise: obtaining a first set of output values from a first execution of a quantum approximate optimization algorithm (QAOA), wherein the first set of output values is generated by a quantum processor unit (QPU) based on a first set of input values for the QAOA; based on the first set of output values, using a Bayesian optimizer running on the one or more classical processor units to select a second set of input values for the QAOA; and obtaining a second set of output values from a second execution of the QAOA, wherein the second set of output values is generated by the quantum processor unit based on the second set of input values for the QAOA.

According to some embodiments, a hybrid computer system may comprise a quantum processor unit (QPU) and one or more classical processor units, the hybrid computer system being configured to perform operations comprising: obtaining a first set of output values from a first execution of a quantum approximate optimization algorithm (QAOA), wherein the first set of output values is generated by the QPU based on a first set of input values for the QAOA; based on the first set of output values, using a Bayesian optimizer running on the one or more classical processor units to select a second set of input values for the QAOA; and obtaining a second set of output values from a second execution of the QAOA, wherein the second set of output values is generated by the QPU based on the second set of input values for the QAOA.

FIG. 1 is a block diagram of an example computing system 100. The example computing system 100 shown in FIG. 1 includes a computing environment 101 and access nodes 110A, 110B, 110C. A computing system may include additional or different features, and the components of a computing system may operate as described with respect to FIG. 1 or in another manner.

The example computing environment 101 includes computing resources and exposes their functionality to the access nodes 110A, 110B, 110C (referred to collectively as "access nodes 110"). The computing environment 101 shown in FIG. 1 includes a server 108, a quantum processor unit 103 and other computing resources 107. The computing environment 101 may also include one or more of the access nodes (e.g., the example access node 110A) and other features and components. A computing environment may include additional or different features, and the components of a computing environment may operate as described with respect to FIG. 1 or in another manner.

The example computing environment 101 can provide services to the access nodes 110, for example, as a cloud-based or remote-accessed computer, as a distributed computing resource, as a supercomputer or another type of high-performance computing resource, or in another manner. As shown in FIG. 1, to access computing resources of the computing environment 101, the access nodes 110 send programs 112 to the server 108 and in response, the access nodes 110 receive data 114 from the server 108. The access nodes 110 may access services of the computing environment 101 in another manner, and the server 108 or other components of the computing environment 101 may expose computing resources in another manner.

Any of the access nodes 110 can operate local to, or remote from, the server 108 or other components of the computing environment 101. In the example shown in FIG.

1, the access node 110A has a local data connection to the server 108 and communicates directly with the server 108 through the local data connection. The local data connection can be implemented, for instance, as a wireless Local Area Network, an Ethernet connection, or another type of wired or wireless connection. Or in some cases, a local access node can be integrated with the server 108 or other components of the computing environment 101. Generally, the computing system 100 can include any number of local access nodes.

In the example shown in FIG. 1, the access nodes 110B, 110C each have a remote data connection to the server 108, and each communicates with the server 108 through the remote data connection. The remote data connection in FIG. 1 is provided by a wide area network 120, such as, for example, the Internet or another type of wide area communication network. In some cases, remote access nodes use another type of remote data connection (e.g., satellite-based connections, a cellular network, a private network, etc.) to access the server 108. Generally, the computing system 100 can include any number of remote access nodes.

The example server 108 shown in FIG. 1 communicates with the access nodes 110 and the computing resources in the computing environment 101. For example, the server 108 can delegate computational tasks to the quantum processor unit 103 and the other computing resources 107, and the server 108 can receive the output data from the computational tasks performed by the quantum processor unit 103 and the other computing resources 107. In some implementations, the server 108 includes a personal computing device, a computer cluster, one or more servers, databases, networks, or other types of classical or quantum computing equipment. The server 108 may include additional or different features and may operate as described with respect to FIG. 1 or in another manner.

The example quantum processor unit 103 operates as a quantum computing resource in the computing environment 101. The other computing resources 107 may include additional quantum computing resources (e.g., quantum processor units, quantum virtual machines or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the server 108 generates computing jobs, identifies an appropriate computing resource in the computing environment 101 to execute the computing job, and sends the computing job to the identified resource for execution. For example, the server 108 may send a computing job to the quantum processor unit 103 or any of the other computing resources 107. A computing job can be formatted, for example, as a computer program, function, code or other type of computer instruction set. Each computing job includes instructions that, when executed by an appropriate computing resource, perform a computational task and generate output data based on input data. For example, a computing job can include instructions formatted for a quantum processor unit, a quantum virtual machine, a digital microprocessor, co-processor or other classical data processing apparatus, or another type of computing resource.

In some implementations, the server 108 operates as a host system for the computing environment 101. For example, the access nodes 110 may send programs 112 to server 108 for execution in the computing environment 101. The server 108 can store the programs 112 in a program queue, generate one or more computing jobs for executing the programs 112, generate a schedule for the computing jobs, allocate computing resources in the computing environment 101 according to the schedule, and delegate the computing jobs to the allocated computing resources. The server 108 can receive, from each computing resource, output data from the execution of each computing job. Based on the output data, the server 108 may generate additional computing jobs, generate data 114 that is provided back to an access node 110, or perform another type of action.

In some implementations, all or part of the computing environment 101 operates as a cloud-based quantum computing (QC) environment, and the server 108 operates as a host system for the cloud-based QC environment. For example, the programs 112 can be formatted as quantum computing programs for execution by one or more quantum processor units. The server 108 can allocate quantum computing resources (e.g., one or more QPUs, one or more quantum virtual machines, etc.) in the cloud-based QC environment according to the schedule, and delegate quantum computing jobs to the allocated quantum computing resources for execution.

In some implementations, all or part of the computing environment 101 operates as a hybrid computing environment, and the server 108 operates as a host system for the hybrid environment. For example, the programs 112 can be formatted as hybrid computing programs, which include instructions for execution by one or more quantum processor units and instructions that can be executed by another type of computing resource. The server 108 can allocate quantum computing resources (e.g., one or more QPUs, one or more quantum virtual machines, etc.) and other computing resources in the hybrid computing environment according to the schedule, and delegate computing jobs to the allocated computing resources for execution. The other (non-quantum) computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the server 108 can select the type of computing resource (e.g., quantum or otherwise) to execute an individual computing job in the computing environment 101. For example, the server 108 may select a particular quantum processor unit (QPU) or other computing resource based on availability of the resource, speed of the resource, information or state capacity of the resource, a performance metric (e.g., process fidelity) of the resource, or based on a combination of these and other factors. In some cases, the server 108 can perform load balancing, resource testing and calibration, and other types of operations to improve or optimize computing performance.

The example server 108 shown in FIG. 1 may include a quantum machine instruction library or other resources that the server 108 uses to produce quantum computing jobs to be executed by quantum computing resources in the computing environment 101 (e.g., by the quantum processor unit 103). The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by the programs 112. For instance, the server 108 or the computing environment 101 can expose the quantum machine instruction library to the access nodes 110 through a set of application programming interfaces (APIs). Accordingly, the programs 112 that are produced by the access nodes 110 and delivered to the server 108 may include information that invokes a quantum machine instruction library stored at the server 108. In some implementations, one or more of the access nodes 110 includes a local version of a quantum machine instruction library. Accordingly, the programs 112 that are produced by the access node 110B and delivered to the server 108 may include instruction sets from a quantum machine instruction library.

The example quantum processor unit 103 shown in FIG. 1 can perform quantum computational tasks by executing quantum machine instructions. In some implementations, the quantum processor unit 103 can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, the quantum processor unit 103 can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, the quantum processor unit 103 can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation, or other computational regimes may be used. Pairs of qubits can be addressed, for example, with two-qubit logic operations that can generate entanglement, independent of other pairs of qubits. In some implementations, more than two qubits can be addressed, for example, with multi-qubit quantum logic operations capable of generating multi-qubit entanglement. In some implementations, the quantum processor unit 103 is constructed and operated according to a scalable quantum computing architecture. For example, in some cases, the architecture can be scaled to many qubits to achieve large-scale general purpose coherent quantum computing.

The example quantum processor unit 103 shown in FIG. 1 includes controllers 106, signal hardware 104, and a quantum processor cell 102. A quantum processor unit may include additional or different features, and the components of a quantum processor unit may operate as described with respect to FIG. 1 or in another manner.

In some instances, all or part of the quantum processor cell 102 functions as a quantum processor, a quantum memory, or another type of subsystem. In some examples, the quantum processor cell 102 includes a quantum circuit system. The quantum circuit system may include qubit devices, resonator devices and possibly other devices that are used to store and process quantum information. In some cases, the quantum processor cell 102 includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102. In some cases, the quantum processor cell 102 includes an ion trap system, and the qubit devices are implemented as trapped ions controlled by optical signals delivered to the quantum processor cell 102. In some cases, the quantum processor cell 102 includes a spin system, and the qubit devices are implemented as nuclear or electron spins controlled by microwave or radio-frequency signals delivered to the quantum processor cell 102. The quantum processor cell 102 may be implemented based on another physical modality of quantum computing.

In some implementations, the example quantum processor cell 102 can process quantum information by applying control signals to the qubits in the quantum processor cell 102. The control signals can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

The example signal hardware 104 includes components that communicate with the quantum processor cell 102. The signal hardware 104 may include, for example, waveform generators, amplifiers, digitizers, high-frequency sources, DC sources, AC sources and other types of components. The signal hardware may include additional or different features and components. In the example shown, components of the signal hardware 104 are adapted to interact with the quantum processor cell 102. For example, the signal hardware 104 can be configured to operate in a particular frequency range, configured to generate and process signals in a particular format, or the hardware may be adapted in another manner.

In some instances, one or more components of the signal hardware 104 generate control signals, for example, based on control information from the controllers 106. The control signals can be delivered to the quantum processor cell 102 to operate the quantum processor unit 103. For instance, the signal hardware 104 may generate signals to implement quantum logic operations, readout operations or other types of operations. As an example, the signal hardware 104 may include arbitrary waveform generators (AWGs) that generate electromagnetic waveforms (e.g., microwave or radio-frequency) or laser systems that generate optical waveforms. The waveforms or other types of signals generated by the signal hardware 104 can be delivered to devices in the quantum processor cell 102 to operate qubit devices, readout devices, bias devices, coupler devices or other types of components in the quantum processor cell 102.

In some instances, the signal hardware 104 receives and processes signals from the quantum processor cell 102. The received signals can be generated by operation of the quantum processor unit 103. For instance, the signal hardware 104 may receive signals from the devices in the quantum processor cell 102 in response to readout or other operations performed by the quantum processor cell 102. Signals received from the quantum processor cell 102 can be mixed, digitized, filtered, or otherwise processed by the signal hardware 104 to extract information, and the information extracted can be provided to the controllers 106 or handled in another manner. In some examples, the signal hardware 104 may include a digitizer that digitizes electromagnetic waveforms (e.g., microwave or radio-frequency) or optical signals, and a digitized waveform can be delivered to the controllers 106 or to other signal hardware components. In some instances, the controllers 106 process the information from the signal hardware 104 and provide feedback to the signal hardware 104; based on the feedback, the signal hardware 104 can in turn generate new control signals that are delivered to the quantum processor cell 102.

In some implementations, the signal hardware 104 includes signal delivery hardware that interface with the quantum processor cell 102. For example, the signal hardware 104 may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor cell 102. In some instances, signal delivery hardware performs preprocessing, signal conditioning or other operations on readout signals received from the quantum processor cell 102.

The example controllers 106 communicate with the signal hardware 104 to control operation of the quantum processor unit 103. The controllers 106 may include digital computing hardware that directly interfaces with components of the signal hardware 104. The example controllers 106 may include processors, memory, clocks and other types of systems or subsystems. The processors may include one or more single-core or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory, a digital or quantum memory, or another type of computer storage medium. The controllers 106 may include additional or different features and components.

In some implementations, the controllers 106 include memory or other components that store quantum state information, for example, based on qubit readout operations performed by the quantum processor unit 103. For instance, the states of one or more qubits in the quantum processor cell 102 can be measured by qubit readout operations, and the measured state information can be stored in a cache or other type of memory system in one or more of the controllers 106. In some cases, the measured state information is used in the execution of a quantum algorithm, a quantum error correction procedure, a quantum processor unit (QPU) calibration or testing procedure, or another type of quantum process.

In some implementations, the controllers 106 include memory or other components that store quantum machine instructions, for example, representing a quantum program for execution by the quantum processor unit 103. In some cases, the quantum machine instructions are received from the server 108 in a hardware-independent format. For example, quantum machine instructions may be provided in a quantum instruction language such as Quil, described in the publication "A Practical Quantum Instruction Set Architecture," arXiv:1608.03355v2, dated Feb. 17, 2017, or another quantum instruction language. For instance, the quantum machine instructions may be written in a format that can be executed by broad range of quantum processor units or quantum virtual machines.

In some instances, the controllers 106 can interpret the quantum machine instructions and generate hardware-specific control sequences configured to execute the operations proscribed by the quantum machine instructions. For example, the controllers 106 may generate control information that is delivered to the signal hardware 104 and converted to control signals that control the quantum processor cell 102.

In some implementations, the controllers 106 include one or more clocks that control the timing of operations. For example, operations performed by the controllers 106 may be scheduled for execution over a series of clock cycles, and clock signals from one or more clocks can be used to control the relative timing of each operation or groups of operations. In some cases, the controllers 106 schedule control operations according to quantum machine instructions in a quantum computing program, and the control information is delivered to the signal hardware 104 according to the schedule in response to clock signals from a clock or other timing system.

In some implementations, the controllers 106 include processors or other components that execute computer program instructions (e.g., instructions formatted as software, firmware, or otherwise). For example, the controllers 106 may execute a quantum processor unit (QPU) driver software, which may include machine code compiled from any type of programming language (e.g., Python, C++, etc.) or instructions in another format. In some cases, QPU driver software receives quantum machine instructions (e.g., based on information from the server 108) and quantum state information (e.g., based on information from the signal hardware 104), and generates control sequences for the quantum processor unit 103 based on the quantum machine instructions and quantum state information.

In some instances, the controllers 106 generate control information (e.g., a digital waveform) that is delivered to the signal hardware 104 and converted to control signals (e.g., analog waveforms) for delivery to the quantum processor cell 102. The digital control information can be generated based on quantum machine instructions, for example, to execute quantum logic operations, readout operations, or other types of control.

In some instances, the controllers 106 extract qubit state information from qubit readout signals, for example, to identify the quantum states of qubits in the quantum processor cell 102 or for other purposes. For example, the controllers may receive the qubit readout signals (e.g., in the form of analog waveforms) from the signal hardware 104, digitize the qubit readout signals, and extract qubit state information from the digitized signals.

Figure 2:
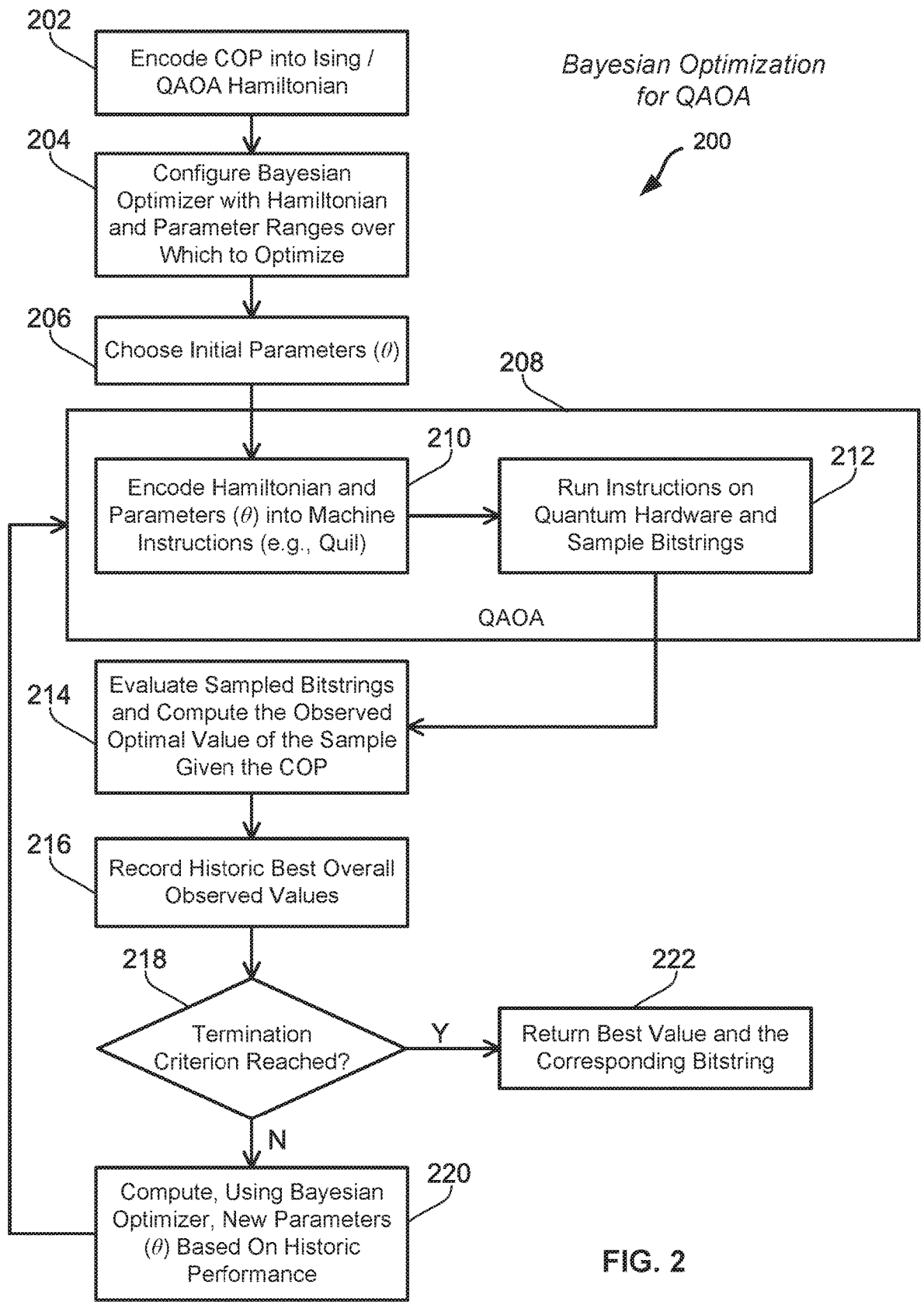
FIG. 2 is a flow chart showing an example hybrid classical-quantum computing process.

In some implementations, the computing environment 101 can implement a hybrid classical-quantum algorithm for optimization. As an example, the QPU 103 may be programmed to execute a quantum approximate optimization algorithm (QAOA). Example techniques for implementing the QAOA are described, for instance, in U.S. Patent Pub. No. 2018/0260731, incorporated by reference in its entirety herein, although, in some cases, the QAOA may be implemented in other manners. In some cases, the QAOA may be parameterized to solve a combinatorial optimization problem (COP) or another type of optimization problem. The QAOA applied to the Maximum Cut problem and other COPs is described in arXiv:1712.05771v1 entitled "Unsupervised Machine Learning on a Hybrid Quantum Computer" by J. S. Otterbach et al., available at https://arxiv.org/pdf/1712.05771.pdf, incorporated by reference in its entirety herein. FIG. 2 shows an example process 200 in which the QAOA is applied to solving COPs in a hybrid classical-quantum system.

When executing the QAOA, a classical co-processor selects values for a set of parameters (θ); a quantum processor then prepares quantum states based on the selected values for the set of parameters (θ) and a cost operator (the cost operator represents the problem for which an optimal solution is sought); and the quantum states are measured to obtain a set of bitstrings (e.g., a projective measurement can be used to obtain classical bitstrings). The process of selecting values of the parameters (θ) can be a challenging task, and can be important for improving operation (e.g., speed and efficiency) of the QAOA.

In some implementations, a Bayesian Optimizer or similar optimizer system is used to select values of the parameters (θ) for the QAOA. For example, a Bayesian Optimizer can define distributions for the parameters (θ), and refine the distributions based on the bitstrings produced by the QAOA (and other information, such as the input values that produced the bitstrings). The refined distributions can be used to select new values of the parameters (θ) for a subsequent execution of the QAOA. For example, arXiv:1712.05771v1 describes Bayesian optimization of the QAOA applied to the Maximum Cut problem.

QAOA with Bayesian optimization as described herein can be applied to a variety of combinatorial optimization problems (COPs) that are reducible to Maximum Cut, including any of the twenty-one example COPs, known as "Karp's 21 problems," which are described in the publication entitled "Reducibility among Combinatorial Problems" (by Richard M. Karp, in Complexity of Computer Computations, edited by R. E. Miller and J. W. Thatcher (New York: Plenum, 1972) pp. 85-103): (1) the satisfiability problem, (2) the 0-1 integer programming problem, (3) the clique problem, (4) the set packing problem, (5) the node cover problem, (6) the set covering problem, (7) the feedback node set problem, (8) the feedback arc set problem, (9) the directed Hamilton circuit problem, (10) the undirected Hamilton circuit problem, (11) the satisfiability with at most 3 literals per clause problem, (12) the chromatic number problem, (13) the clique cover problem, (14) the exact cover problem, (15) the hitting set problem, (16) the Steiner tree problem, (17) the three-dimensional matching problem, (18) the knapsack problem, (19) the job sequencing problem, (20) the partition problem, and (21) the Maximum Cut problem. In some cases, the QAOA with Bayesian optimization as described herein can be applied to other types of problems.

FIG. 2 is a flow chart showing an example hybrid classical-quantum computing process 200. Operations in the example process 200 may be performed, for instance, by one or more components of the example computing environment 101 shown in FIG. 1. For example, the process 200 may be performed by the QPU 103, or by the QPU 103 and the server 108, or by the QPU and one or more of the additional computing resources 107.

In the example process 200 shown in FIG. 2, some of the operations are performed by classical computing resources (e.g., a digital microprocessor) and others are performed by quantum computing resources (e.g., a quantum processor). For example, in some implementations, all or part of operation 212 is performed by a quantum processor unit, and all other operations are performed by a classical co-processor. For example, in the example computing environment 101 shown in FIG. 1, executing the operation 212 in FIG. 2 may include storing and processing information in the quantum processor cell 102, while other operations in FIG. 2 may be executed by a classical processor (e.g., in the controllers 106, the server 108 or the additional computing resources 107). In some cases, the process 200 can be executed by other types of hardware.

The example process 200 may include additional or different operations, and the operations may be performed in the order shown or in another order. In some cases, one or more of the operations shown in FIG. 2 are implemented as processes that include multiple operations, sub-processes or other types of routines. In some cases, operations can be combined, performed in another order, performed in parallel, iterated, or otherwise repeated or performed in another manner.

At 202, a combinatorial optimization problem (COP) is encoded into a Hamiltonian $\hat{H}$ in a format that is suitable for the quantum approximation optimization algorithm (QAOA). For example, the COP may be encoded as an Ising Hamiltonian of the form $$\hat{H} = \sum_{i,j} J_{i,j}\sigma_i\sigma_j - \mu\sum_j h_j\sigma_j.$$

In some cases, the COP may be encoded in another type of Hamiltonian $\hat{H}$.

At 204, a Bayesian optimizer is configured with the Hamiltonian $\hat{H}$ and parameter ranges over which to optimize. For example, an initial range of possible values for the parameters (θ) can be specified. Generally, a Bayesian optimizer can be used to analyze a function that is not analytically known (e.g., a so-called "black-box" function). The function generally operates on input parameters and produces one or more outputs that can be observed. The Bayesian optimizer can define distributions for the input parameters and refine the distributions based on observations produced by evaluating the function on specific values of the parameters. As an example, Algorithm 3 in arXiv:1712.05771v1 describes Bayesian Optimization of QAOA Extreme Value Statistics, and the discussion explains how this is applied to the Maximum Cut problem.

At 206, an initial set of values for the parameters (θ) is chosen. The initial set of values for the parameters (θ) may be chosen randomly, by sampling a grid, or in another manner. In some cases, a predefined set of values may be used as the initial set of values for the parameters (θ). The Bayesian Optimizer is initialized by evaluating the black box at n different randomly chosen parameters $\theta_1 \ldots \theta_n$ to build up the initial distribution.

At 208, the QAOA is executed based on the current set of values assigned to the parameters (θ). As shown in FIG. 2, executing the QAOA includes operations 210 and 212. The QAOA may be executed in another manner, for example, using additional or different operations. In some implementations, the QAOA is executed as a hybrid classical-quantum algorithm that is performed using both classical resources (e.g., a classical processor unit) and quantum resources (e.g., a quantum processor unit). For instance, operation 210 may utilize a classical resource (e.g., the server 108 or controllers 106 in the example shown in FIG. 1) and the operation 212 may utilize a quantum resource (e.g., the QPU 103 shown in FIG. 1). As an example, U.S. Patent Pub. No. 2018/0260731 provides example quantum logic circuits and quantum machine instructions that may be used to implement the QAOA, although the QAOA may be executed in another manner.

At 210, the Hamiltonian $\hat{H}$ and values of the parameters (θ) are encoded into machine instructions (e.g., a quantum machine instruction language such as Quil, or another language). For instance, the machine instructions can define a computer program to perform preparation of the state $$|\psi(x;\theta)\rangle = \prod_{i=1}^{p} [e^{-i\theta_{2i-1}H_D} e^{-i\theta_{2i}H_C}] H^{\otimes n} |0\rangle$$

using the initial set of values (selected at 206) for the parameters (θ), with the Hamiltonian $\hat{H}$ encoded as the cost operator $H_C$.

At 212, the machine instructions are run on the quantum hardware resource, and bitstrings are sampled from the quantum hardware resource. For example, the machine instructions generated at 210 can be provided to the QPU 103 shown in FIG. 1, and the QPU can execute the machine instructions to prepare the quantum state $|\psi(x;\theta)\rangle$. The bitstrings can be obtained, for example, by performing a projective measurement on the qubits of the resulting quantum state $|\psi(x;\theta)\rangle$. The quantum state can be prepared iteratively (starting from the same initial state on each iteration) in order to obtain several distinct bitstring samples based on the set of values selected (at 206) for the parameters (θ).

At 214, the sampled bitstrings are evaluated, and the observed optimal value of the samples are computed for the COP. In the example of the QAOA applied to the max cut problem, the Ising Hamiltonian for the max cut problem is evaluated for each of the bitstrings returned from the QAOA algorithm, and the optimal bitstring is the one that minimizes the energy of the Ising Hamiltonian. The bitstring that returns the optimal value, according to the COP being analyzed, is thus identified. At 216, the historic best overall observed values are recorded. For example, as the process 200 is iterated, the best overall value, according to the COP being analyzed, may be updated on each iteration. In the example of the QAOA applied to the max cut problem, the bitstring that minimizes the energy of the Ising Hamiltonian for the max cut problem is the optimal value.

At 218, it is determined whether a terminating criterion has been reached. For example, a terminating criterion may include a maximum number of iterations; or achievement of a specified precision (sufficient precision), or a combination of these or other criteria.

If it is determined at 218 that the terminating criterion has not been reached, then the process 200 proceeds to 220. If it is determined at 218 that the terminating criterion has been reached, then the process 200 proceeds to 222.

At 220, new values of the parameters (θ) are computed, and the process 200 returns to 208 for another execution of the QAOA. Here, the Bayesian optimizer is used to compute the new values of the parameters (θ). Accordingly, each of the bitstrings returned (at 212) from the QAOA algorithm can be used to update distributions (defined by the Bayesian optimizer) for the parameters (θ), and the updated distributions can be sampled to determine the new values for the parameters (θ). The Bayesian optimizer may be used, for example, by executing a program on a classical processor unit.

In some embodiments, the method of using a Bayesian optimizer to select a second set of input values for the QAOA may include: updating the set of distributions based on the first set of input values and the first set of output values, using a Gaussian process model; and using the updated distributions to select the second set of input values for the QAOA. Furthermore, the method wherein the distributions for the respective input parameters may be Gaussian distributions for respective parameters in the QAOA.

When the process 200 returns to 208 for another iteration of the QAOA, the new values of the parameters (θ) computed at 220 are used to instantiate the next iteration of the QAOA. Accordingly, in some cases, the process 200 is an iterative process in which operations 208, 214, 16, 218, 220 (and possibly other operations) are iterated until the terminating condition is reached. On each current iteration of the iterative process, the current set of values of the parameters (θ) (computed at 220 in the prior iteration), may be used in the execution of the QAOA for the current iteration. And on each current iteration, a current set of output values (a set of bitstrings) is obtained at 212 by projectively measuring qubits of the quantum processor unit.

At 222, the best value for the COP being studied and the corresponding bitstring are returned. In the example of the QAOA applied to the max cut problem, the optimal value according to the max cut problem and the associated bitstring are returned.

In some embodiments, the optimization procedure described herein can be applied to problems beyond the strict domain of COP. Furthermore, in some embodiments instead of using an Ising Hamiltonian, a non-classical or true quantum Hamiltonian (without a classical counterpart) may be used.

Some of the subject matter and operations described in this specification can be implemented in digital electronic circuitry or quantum processor circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a classical computer, a quantum computer, a hybrid quantum/classical computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit), quantum information processing circuitry, or other types of systems.

Processors suitable for the execution of a computer program include, by way of example, both general and special purpose microprocessors, quantum information processors, and processors of any kind of digital or quantum computer. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device. Devices suitable for storing computer program instructions and data include all forms of non-volatile memory, media and memory devices, including by way of example quantum memory systems, semiconductor memory devices (e.g., EPROM, EEPROM, flash memory devices, and others), etc. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending data to and receiving data from a device that is used by the user; for example, by exchanging network packets with the device.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

The invention claimed is:

1. A method comprising:
obtaining a first set of output values from a first execution of a quantum approximate optimization algorithm (QAOA), wherein the first set of output values is generated by a quantum processor unit based on a first set of input values for the QAOA;
based on the first set of output values, using a Bayesian optimizer running on one or more classical processor units to select a second set of input values for the QAOA; and
obtaining a second set of output values from a second execution of the QAOA, wherein the second set of output values is generated by the quantum processor unit based on the second set of input values for the QAOA.

2. The method of claim 1, wherein the Bayesian optimizer comprises a set of distributions for respective input parameters of the QAOA, and the method comprises:
- updating the set of distributions based on the first set of input values and the first set of output values, using a Gaussian process model; and
- using the updated distributions to select the second set of input values for the QAOA.

3. The method of claim 2, wherein the distributions for the respective input parameters are Gaussian distributions for respective parameters in the QAOA.

4. The method of claim 2, further comprising executing an iterative process, where respective iterations of the iterative process include:
- obtaining a new set of output values from an execution of the QAOA on the quantum processor unit;
- updating the distributions of the Bayesian optimizer based on the new set of output values; and
- selecting a new set of input values for the QAOA based on the updated distributions.

5. The method of claim 1, wherein the QAOA is configured to solve a combinatorial optimization problem (COP), wherein the COP comprises a cost operator, and the COP is encoded in the cost operator.

6. The method of claim 5, wherein the QAOA is configured to solve a Maximum Cut problem.

7. The method of claim 5, wherein the cost operator comprises an Ising Hamiltonian, and the method comprises evaluating the Ising Hamiltonian based on the first and second sets of output values.

8. A hybrid computer system comprising a quantum processor unit (QPU) and one or more classical processor units, the hybrid computer system being configured to perform operations comprising:
- obtaining a first set of output values from a first execution of a quantum approximate optimization algorithm (QAOA), wherein the first set of output values is generated by the QPU based on a first set of input values for the QAOA;
- based on the first set of output values, using a Bayesian optimizer running on the one or more classical processor units to select a second set of input values for the QAOA; and
- obtaining a second set of output values from a second execution of the QAOA, wherein the second set of output values is generated by the QPU based on the second set of input values for the QAOA.

9. The system of claim 8, wherein the Bayesian optimizer comprises a set of distributions for respective input parameters of the QAOA, and the system is further configured to perform operations comprising:
- updating the set of distributions based on the first set of input values and the first set of output values, using a Gaussian process model running on the one or more classical processor units; and
- using the updated distributions to select the second set of input values for the QAOA.

10. The system of claim 9, wherein the distributions for the respective input parameters are Gaussian distributions for respective parameters in the QAOA.

11. The system of claim 8, wherein the hybrid computer system is configured to perform operations further comprising executing an iterative process, where respective iterations of the iterative process include:
- obtaining a new set of output values from an execution of the QAOA on the quantum processor unit;
- updating, by operation of the one or more classical processor units, the distributions of the Bayesian optimizer based on the new set of output values; and
- selecting, by operation of the one or more classical processor units, a new set of input values for the QAOA based on the updated distributions.

12. The system of claim 8, wherein the QAOA is configured to solve a combinatorial optimization problem (COP), wherein the COP comprises a cost operator, and the COP is encoded in the cost operator.

13. The system of claim 8, wherein the QAOA is configured to solve a Maximum Cut problem.

14. The system of claim 8, wherein the cost operator comprises an Ising Hamiltonian, and wherein the hybrid computer system is configured to perform operations further comprising evaluating, by the one or more classical processor unit, the Ising Hamiltonian based on the first and second sets of output values.

* * * * *